United States Patent

Graser

[11] 4,450,273
[45] May 22, 1984

[54] NN' PARA METHOXY BENZYL PERYLENE-3,4,9,10-TETRACARBOXYLIC ACID DIIMIDE

[75] Inventor: Fritz Graser, Ludwigshafen, Fed. Rep. of Germany

[73] Assignee: BASF Aktiengesellschaft, Rheinland-Pfalz, Fed. Rep. of Germany

[21] Appl. No.: 337,506

[22] Filed: Jan. 6, 1982

[30] Foreign Application Priority Data

Jan. 22, 1981 [DE] Fed. Rep. of Germany ....... 3101885

[51] Int. Cl.³ .............................................. C09B 5/62
[52] U.S. Cl. .................. 546/37; 106/288 Q
[58] Field of Search ......................................... 546/37

[56] References Cited

U.S. PATENT DOCUMENTS

| | | |
|---|---|---|
| 2,473,015 | 6/1949 | Cullinan ............................... 546/37 |
| 3,022,299 | 2/1962 | Schmidt et al. ........................ 546/37 |
| 4,262,851 | 4/1981 | Graser et al. ..................... 546/37 X |

FOREIGN PATENT DOCUMENTS

| | | |
|---|---|---|
| 1130099 | 11/1962 | Fed. Rep. of Germany . |
| 2451781 | 1/1976 | Fed. Rep. of Germany ........ 546/37 |
| 2451780 | 2/1976 | Fed. Rep. of Germany ........ 546/37 |
| 2451783 | 2/1976 | Fed. Rep. of Germany ........ 546/37 |
| 2111823 | 6/1972 | France . |
| 372163 | 11/1963 | Switzerland . |
| 1523475 | 8/1978 | United Kingdom . |
| 1537358 | 12/1978 | United Kingdom . |

OTHER PUBLICATIONS

Graser et al., Liebigs Ann. Chem. 1980, 1994–2011.
Maki et al., Chem. Abstracts 47, 6143c.

*Primary Examiner*—Donald G. Daus
*Assistant Examiner*—William A. Teoli, Jr.
*Attorney, Agent, or Firm*—Oblon, Fisher, Spivak, McClelland & Maier

[57] ABSTRACT

A perylene-3,4,9,10-tetracarboxylic acid diimide of the formula

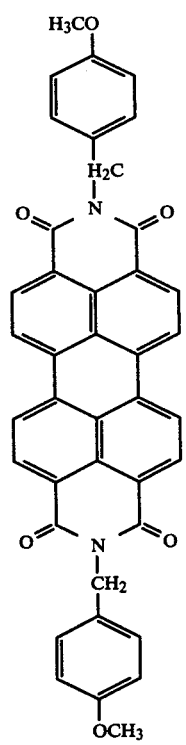

gives black colorations with excellent lightfastness and weathering fastness, in polyethylene, PVC, surface coatings, inks and aqueous dye formulations.

1 Claim, 1 Drawing Figure

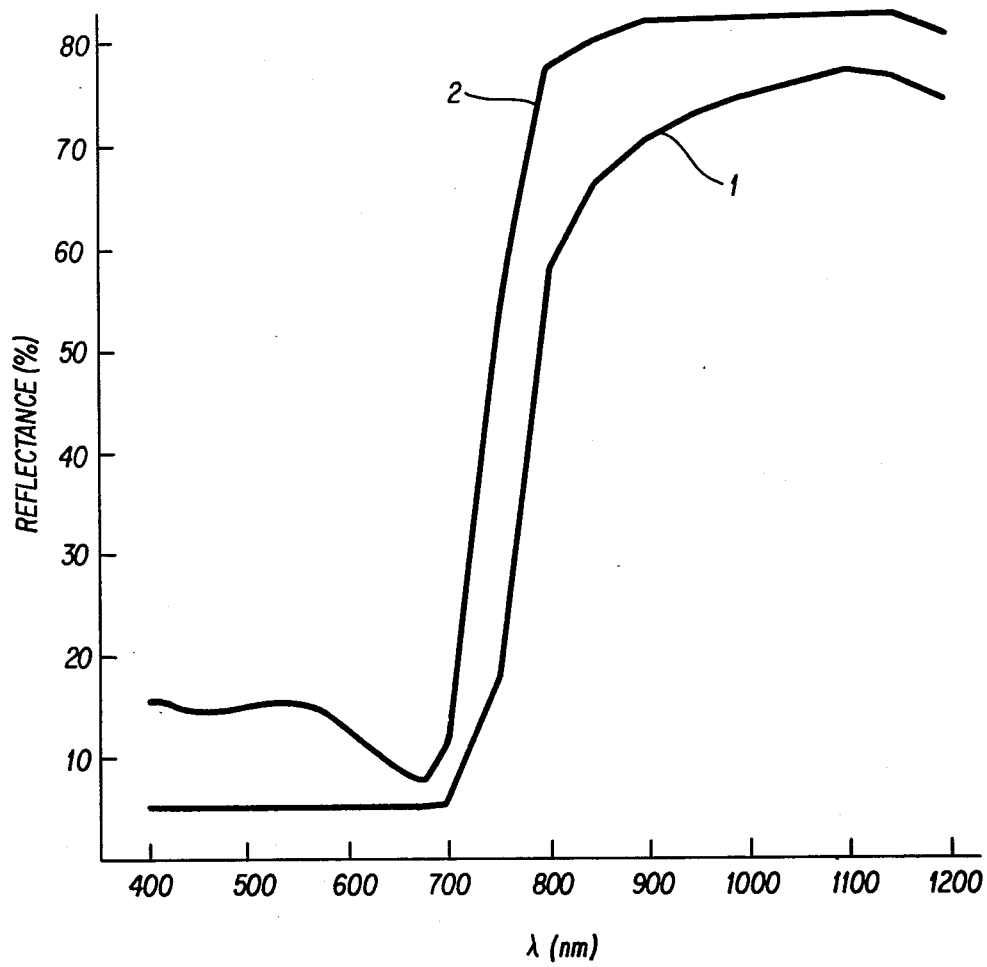

NN' PARA METHOXY BENZYL PERYLENE-3,4,9,10-TETRACARBOXYLIC ACID DIIMIDE

The present invention relates to a novel perylene-3,4,9,10-tetracarboxylic acid diimide.

The novel perylene-3,4,9,10-tetracarboxylic acid diimide, also referred to hereafter simply as diimide, has the formula

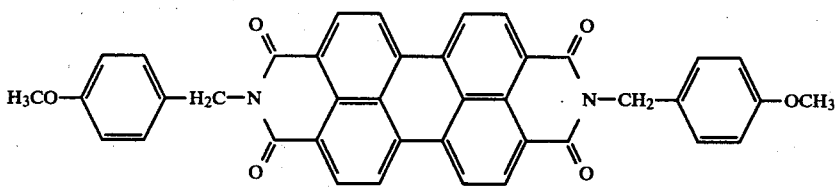

and is very suitable as a black dye for polyethylene, polyvinyl chloride, surface coatings, inks and aqueous dye formulations. Olive hues are obtained in transparent polyvinyl chloride colorations. The black to olive colorations have good fastness characteristics in media which have little or no dissolving power for the diimide (I), so that the pigment is present in the medium in its crystalline form, with which the black color is associated. Since the dissolving power of plastics increases with temperature, (I) is suitable for use only in those media which are colored and processed below 250° C. and therefore do not dissolve the pigment. This is the case for the above thermoplastics, surface coatings, inks and aqueous dye formulations.

When the diimide (I) is incorporated into polystyrene, a polycarbonate or a polyacrylate, a process which as a rule has to be carried out at above 250° C., some of the diimide is dissolved by the thermoplastic as the temperature increases, and, at a sufficiently high temperature, the diimide is finally completely dissolved. Orange colorations which fluoresce in a transparent composition and also have good lightfastness are finally obtained from the black pigment, via reddish black, or, as a white reduction, reddish gray, colorations. In the orange compositions, (I) is dissolved in the form of a molecular dispersion, which is obtained in particular when the concentration of (I) is lower than the dissolving power of the thermoplastic for (I) at the processing temperature.

The diimide (I) is of particular interest as a black dye for producing black to olive colorations. The dye exhibits excellent lightfastness and weathering fastness, very good fastness to overcoating and good fastness to plasticizers. (I) can also be mixed with other dyes to formulate other dark hues, for example olive hues for military articles. Gray hues can be obtained by mixing with white pigments, for example titanium dioxide. The novel dye (I) is of particular interest for coloring surface coatings and polyvinyl chloride.

In the infrared range, the dye (I) exhibits excellent reflectance and is therefore very suitable for the production of camouflage colors. The infrared reflectance is similar to that of chlorophyll, ie. the reflectance at 650 nm is no greater than that at 550 nm. When the dye is mixed with a white pigment, eg. titanium dioxide, the coloration exhibits the important decrease in reflectance between 550 and 700 nm, and the desired steep increase in reflectance from 700 nm. In these properties, the diimide (I) is clearly superior to the black pigments disclosed in German Pat. Nos. 2,451,780, 2,451,781 and 2,451,783.

It was not to be foreseen that the diimide (I) would be a black pigment, since, on the basis of the data in Swiss Pat. No. 372,163 and German Pat. No. 1,130,099, it was to be expected that the di-4-methoxybenzylimide of perylene-3,4,9,10-tetracarboxylic acid would be a red pigment, like the dimethylimide and diethylimide.

Since the black color of the pigment particle depends on the structure of the crystal lattice, and the latter cannot be deduced from the molecular structure and therefore cannot be predicted (see F. Graser and E. Häicke, Liebigs Annalen der Chemie 1980, 1944 et seq.), it could not be foreseen, even with a knowledge of German Pat. Nos. 2,451,783, 2,451,780 and 2,451,781, that the diimide (I) would be a black pigment.

The diimide (I) is prepared in a conventional manner by reacting perylene-3,4,9,10-tetracarboxylic acid or its dianhydride with 4-methoxybenzylamine in water or an organic solvent at elevated temperatures, under atmospheric or superatmospheric pressure.

The synthesized crude diimide (crude dye) can be used as obtained or be converted in a conventional manner into particular finished forms, by additional measures, for example by conversion into a finely divided form by reprecipitation from sulfuric acid or by milling, with or without subsequent recrystallization in water and/or organic solvents at an elevated temperature.

The Examples which follow illustrate the invention further. Parts and percentages are by weight.

EXAMPLE 1

110 parts of perylenetetracarboxylic acid dianhydride and 100 parts of 4-methoxybenzylamine in 1,200 parts of ethylene glycol were heated to 170°–175° C., whilst stirring, and kept at this temperature until perylenetetracarboxylic acid was no longer detectable, which was the case after about one hour. The mixture was allowed to cool to about 80° C., diluted with 650 parts of methanol and filtered at about 40° C. The residue was washed with 300 parts of methanol and then with water, and was dried. Yield: 174 parts of perylenetetracarboxylic acid bis-(4-methoxybenzylimide) as an olive-black powder. Small olive-green needle-like crystals can be seen under the microscope.

Analysis: $C_{40}H_{26}N_2O_6$ (molecular weight 630.6)

calculated 76.2%; C: 4.1%; H: 15.2%; O: 4.4% N;
found 75.8%; C: 4.2%; H: 15.6%; O: 4.4% N.

For use as a pigment, the crude product is finely milled in a high speed agitator mill, as described in German Published Application DAS No. 2,832,761, Example 1.

EXAMPLE 2

78.4 parts of perylenetetracarboxylic acid dianhydride and 57.6 parts of 4-methoxybenzylamine were stirred into 1,000 parts of water, and the mixture was heated to 130°-135° C. in a pressure-tight closed reaction vessel and stirred at this temperature for about 5 hours, after which free perylenetetracarboxylic acid was no longer detectable in a sample. The reaction mixture was cooled, the pressure was released, hot water was added to the mixture, the pH was brought to 4 with 10% strength aqueous sulfuric acid, the mixture was filtered, and the residue was washed neutral with hot water and dried at 80° C. under reduced pressure. Yield: 125 parts of perylenetetracarboxylic acid bis-(4-methoxybenzylimide) as an olive-black powder. Tiny olive-green crystals can be seen under the microscope. The dye can be used directly in this crude form.

Analysis: $C_{40}H_{26}N_2O_6$ (molecular weight 630.6) calculated 76.2%; C: 4.1%; H: 15.2%; O: 4.4%; N: found 75.7%; C: 4.1%; H: 15.5%; O: 4.5%; N.

EXAMPLE 3

10% strength full-shade baking finish (a) 30% strength full-shade paste 3 parts of the finely milled dye of Example 1, paragraph 2, and 7 parts of a varnish-like binder (Grinding Base 100 S of Lawter Chemicals Inc., Chicago) were processed on a three-roll mill in 6 passes at 80 bar, to give a 30% strength full-shade paste.

(b) 10% strength full-shade surface-coating paste 2 parts of the full-shade paste (a) were mixed with 4 parts of a binder mixture consisting of 1 part of an alkyd resin modified with soybean oil, 2 parts of an alkyd resin modified with a synthetic fatty acid, and 3 parts of a solvent-free melamine resin.

(c) Carrying out the coloration

A 100 μm thick layer of the full-shade surface-coating paste (b) was applied onto white cardboard by means of a film casting device, and baked for 45 minutes at 120° C. A black coloration with excellent lightfastness and weathering fastness was obtained.

Between 400 and 1,200 nm, the coloration shows the reflectance values below, measured with a Zeiss RFC 16 spectrophotometer, against absolute white as the standard, up to 700 nm, and with a Zeiss PMQ 2, against barium sulfate, from 700 to 1,200 nm:

| λ [nm] | 400 | 420 | 440 | 460 | 480 | 500 | 520 |
|---|---|---|---|---|---|---|---|
| Reflectance [%] | 5.34 | 5.28 | 5.24 | 5.20 | 5.19 | 5.16 | 5.14 |
| λ [nm] | 540 | 560 | 580 | 600 | 620 | 640 | 660 |
| Reflectance [%] | 5.13 | 5.10 | 5.05 | 5.03 | 5.04 | 5.07 | 5.15 |
| λ [nm] | 680 | 700 | 750 | 800 | 850 | 900 | 950 |
| Reflectance [%] | 5.31 | 5.85 | 22.6 | 58.5 | 66.8 | 70.8 | 73.0 |
| λ [nm] | 1000 | | 1050 | 1100 | | 1150 | 1200 |
| Reflectance [%] | 74.6 | | 76.2 | 77.5 | | 77.0 | 74.8 |

FIG. 1 (attached) shows the reflectance in %, based on absolute white or on barium sulfate, as a function of the wavelength, for the full-shade coloration (Curve 1).

Very similar colorations and infrared reflectance values were obtained when the dye obtained as described in Example 2 was used instead of the finely milled dye of Example 1.

EXAMPLE 4

Baking finish (1:4 white reduction)

(a) 30% strength white paste 42 parts of a binder, obtained by mixing 1 part of an alkyd resin modified with soybean oil with 2 parts of an alkyd resin modified with a synthetic fatty acid, 30 parts of titanium dioxide (rutile), 22 parts of a solvent-free melamine resin and 6 parts of a colloidal silicon dioxide were milled on a three-roll mill at 80 bar, in 6 passes to give a 30% strength white paste.

(b) Surface-coating paste 2.5 parts of the 30% strength full-shade paste of Example 3(a) and 10 parts of the 30% strength white paste (a) were mixed and ground in a millstone mill.

(c) Coloration process

A 100 μm thick layer of the surface-coating paste (b) was applied onto cardboard by means of a film-casting device, and baked for 45 minutes at 120° C. A greenish-gray coloration with excellent lightfastness and weathering fastness was obtained.

The reflectance of the coloration was determined as described in Example 3:

| λ [nm] | 400 | 420 | 440 | 460 | 480 | 500 | 520 |
|---|---|---|---|---|---|---|---|
| Reflectance [%] | 15.56 | 15.25 | 14.45 | 14.28 | 14.45 | 14.85 | 15.12 |
| λ [nm] | 540 | 560 | 580 | 600 | 620 | 640 | 660 |
| Reflectance [%] | 15.10 | 14.75 | 13.78 | 12.35 | 11.01 | 9.80 | 8.83 |
| [nm] | 680 | 700 | 750 | 800 | 850 | 900 | 950 |
| Reflectance [%] | 8.76 | 11.04 | 52.7 | 77.6 | 80.7 | 82.0 | 82.6 |
| [nm] | 1,000 | 1,050 | 1,100 | 1,150 | 1,200 | | |
| Reflectance [%] | 82.8 | 83.2 | 83.6 | 83.1 | 81.4 | | |

The reflectance curve is curve 2 in the FIGURE.

EXAMPLE 5

0.1 part of a finely milled dye, obtained as described in Example 1, paragraph 2, 100 parts of polyvinyl chloride powder (emulsion polymer) and 2 parts of dibutyl-tin bis-(hexylthioglycolate) were homogenized on a roll mill at from 150° to 160° C. for about 8 minutes. The resulting mill hides were pressed to give sheets, in a sheet press at 140° C., under about 0.4 kg/cm². The olive-green sheets obtained have excellent lightfastness.

The same result was obtained with polyvinyl chloride prepared by suspension polymerization.

EXAMPLE 6

0.25 part of a finely milled dye, obtained as described in Example 1, paragraph 2, 2.5 parts of titanium dioxide (rutile) and 50 parts of a mixture consisting of 65 parts of polyvinyl chloride powder, 35 parts of diethylhexyl phthalate and 2 parts of dibutyl-tin bis-(hexylthioglycolate) were homogenized on a roll mill at from 150° to 160° C. for about 8 minutes, milled to give hides, and polished on a calender. Gray sheets with excellent lightfastness and good fastness to plasticizers were obtained.

If 0.5 part, instead of 0.25 part, of dye and 0.25 part, instead of 2.5 parts, of titanium dioxide are used, black sheets with excellent lightfastness and good fastness to plasticizers are obtained.

EXAMPLE 7

0.1 part of a finely milled dye, obtained as described in Example 1, paragraph 2, 50 parts of a mixture consisting of 65 parts of polyvinyl chloride powder, 35 parts of diethylhexyl phthalate and 2 parts of dibutyl-tin bis-(hexylthioglycolate) were homogenized on a roll mill at from 150° to 160° C. for about 8 minutes, milled to give hides, and polished on a calender. Olive-black sheets with excellent lightfastness were obtained.

Very similar colorations were obtained when the dye obtained as described in Example 2 was used instead of the finely milled dye of Example 1.

EXAMPLE 8

0.1 part of a finely milled dye, obtained as described in Example 1, paragraph 2, 100 parts of high pressure polyethylene powder and 1 part of titanium dioxide (rutile) were dry-blended in a drum mixer. The mixture was melted and homogenized in an extruder at a barrel temperature of from 160° to 200° C. The colored plastic mass was granulated by die face cutting or by drawing strands and cooling these. The resulting granules were then molded at 200° C. on an injection molding machine or compression-molded in a press to give articles of any desired shape. Gray articles with excellent lightfastness were obtained.

EXAMPLE 9

0.1 part of a dye, obtained as described in Example 2, 100 parts of suspension polyvinyl chloride powder, 1 part of titanium dioxide (rutile) and 2 parts of dibutyltin bis-(hexyldithioglycolate) were homogenized on a roll mill, as described in Example 5, and then pressed to give sheets. Gray sheets with excellent lightfastness were obtained.

EXAMPLE 10

0.05 part of a dye, obtained as described in Example 2, was mixed with 100 parts of high pressure polyethylene powder, in a drum mixer. The mixture was melted and homogenized in an extruder, at a barrel temperature of from 160° to 200° C. The colored plastic mass was granulated by die face cutting or by drawing strands and cooling these. The resulting granules were then molded on an injection molding machine, at 200° C., or compression-molded in a press to give any desired articles. Blackish-gray articles with excellent lightfastness were obtained.

I claim:

1. A perylene-3,4,9,10-tetracarboxylic diimide of the formula

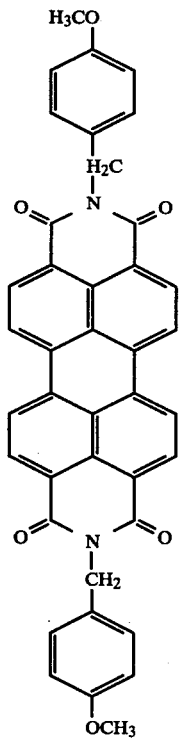

* * * * *